United States Patent Office 2,695,281
Patented Nov. 23, 1954

2,695,281

SILOXANE COMPOSITION AND METHOD OF MAKING THE SAME

John E. Dereich, Painesville, Ohio, assignor to Diamond Alkali Company, Cleveland, Ohio, a corporation of Delaware No Drawing. Application February 18, 1952,
Serial No. 272,249

7 Claims. (Cl. 260—33.6)

This invention relates to siloxane materials and to a method of making the same. It more particularly relates to siloxanes comprising condensed co-hydrolyzates of phenyl and ethyl silicon trihalides, which condensed co-hydrolyzates are characterized by combination with a modifying siloxane material in relatively small amount with respect to said condensed cohydrolyzates, which modifying material produces with said condensed co-hydrolyzates new materials of outstanding heat resistance and resistance to water.

The condensation products of the co-hydrolyzates of phenyl and ethyl silicon trihalides mentioned above are described in the co-pending application of Alfred Hirsch, Serial No. 254,431, filed November 1, 1951, and more particularly comprise the condensed co-hydrolyzates of ethyl silicon trihalide and phenyl silicon trihalide, wherein the ethyl silicon trihalide is present in an amount of at least 10 mol per cent and less than 30 mol per cent of the total mixture. These materials may suitably be prepared by physically combining an ethyl silicon trihalide and a phenyl silicon trihalide in suitable proportions as noted above, hydrolyzing the mixture by any desired means, and isolating a partially condensed cohydrolyzate of the phenyl silicon trihalide and the ethyl silicon trihalide preferably in a solvent. The solvent may be any suitable material, preferably organic, in which this partially condensed co-hydrolyzate is soluble and in which the modifying substance to be described below is soluble, as will be well understood by those skilled in the art, but for convenience will be described specifically with respect to a toluol solution, as that has been found most convenient for the subsequent steps of the invention.

Thus, a suitable starting material for the cohydrolyzate portion of phenyl and ethyl silicon trihalides of the present composition is a toluol solution of the partially condensed co-hydrolyzate of the phenyl and ethyl silicon trihalides, as described above. As noted in the cross-referenced case of Hirsch, the chlorides are the preferable species of the halide genus in view of their easy availability and ready reactivity in the environment described. A particularly suitable species with respect to the amounts in combination of the phenyl and ethyl portions of the material, respectively, is that wherein the ethyl substituent is present to substantially the extent of 20 mol per cent, the remainder of the composition being the phenyl portion thereof, which is present substantially in the amount of 80 mol per cent. This combination, when hydrolyzed by any of the vast variety of means, it being apparent that the method of hydrolysis is without effect upon the ultimate properties of the composition, yields, when ultimately condensed, a hard, tough resin of high heat-resistant properties which has various uses in the art.

It has now been found, however, that despite the advantageous properties of the above-described material, an improvement thereon may be effected, particularly with respect to heat resistance and also to some extent with respect to water resistance. The emphasis on heat resistance is, of course, understandable as these resins generally are in great demand as binders in service where high temperatures are encountered, either by conduction or from friction or the like, and accordingly, any increase in the heat resistance of the resins, while still maintaining the valuable and essentially organic properties, which render the resins so valuable, is advantageous.

In accordance with the principles of the present invention, therefore, there is combined and co-condensed with the aforementioned partially condensed co-hydrolyzate, an additive material in an amount up to 35% of the ultimate condensed material, of a reaction product of a compound of the class R—Si(OR')₂X, wherein R is selected from the group consisting of mono-nuclear aryl, aralkyl, alkaryl and lower alkyl hydrocarbon radicals, R' is a hydrocarbon radical, and X is a halogen selected from the group of chlorine and bromine, preferably chlorine in view of availability, with a tri-hydroxy compound, such as glycerol. The aforesaid additive material is more particularly described in my co-pending application, Serial No. 141,850, filed February 1, 1950, and as described in that case, it is seen that the various portions of the molecule are subject to considerable variation without changing the essential nature of the material. Thus, R in the formula described may be a phenyl radical or any of the many alkyl-substituted derivatives of the phenyl radical, such as mono-, di-, or tri-methyl phenyl, mono-, di-, or tri-ethyl phenyl, as well as the higher alkyl-substituted derivatives of the phenyl radical. The R substituent may also be a lower aliphatic hydrocarbon radical, suitable examples of which include alkyl radicals, both straight and branched chains, having from 1 to 6 carbon atoms. A preferred form of the invention, and that which will be principally described, occurs where R represents a mixture of less than a mol of phenyl radical and less than a mol of ethyl radical, suitably a mixture containing 10–30 mol per cent of ethyl radical and the remainder phenyl radical.

The R' substituent referred to in the formula above may suitably be methyl, ethyl, propyl, or butyl, but since it is understood to be substantially eliminated from the final composition, it is suitably methyl.

Accordingly, a preferred starting material to react with glycerol comprises a mixture of phenyl di-methoxy silicon chloride and ethyl di-methoxy silicon chloride, wherein the ethyl di-methoxy silicon chloride is present in a mol percentage of 10 to 30 mol per cent of the whole, suitably 20 mol per cent of the whole, and the remainder of the composition is phenyl di-methoxy silicon chloride. As described in my aforesaid co-pending application, such a mixture of chlorides may suitably be reacted with glycerol with the immediate replacement of the chloride and the slower replacement of the methoxy groups, in a reaction apparently analogous to alcoholysis of esters, whereby inter-linkage with the glycerol molecule occurs, although in a manner not completely understood at the present time. In any case, these materials, as set forth in my aforesaid co-pending application, are characterized by high tensile strength, though in and of themselves they are somewhat less resistant to water than would be desirable for a binding resin in many applications in which these resins find use.

In accordance with the present invention, therefore, the aforesaid partially condensed co-hydrolyzate of phenyl and ethyl silicon trihalides is combined with the aforesaid reaction product of glycerol with di-alkoxy aryl, or alkyl, halosilane, preferably a mixture of aryl- and alkyl- di-alkoxy halosilanes, to produce a new composition of matter of outstanding properties. For example, it is noted with respect to the cohydrolyzate of particularly phenyl and ethyl silicon trihalides in mol percentages of 80 mol per cent of the former to 20 mol per cent of the latter, that upon complete condensation, a material is obtained which has an extreme upper limit of temperature tolerance of about 400° C. In fact, it has been found that curing of such co-hydrolyzate to complete the condensation must be conducted at temperatures well below 400° C., as that represents the extreme upper limit of temperature tolerance; in general, it is preferred to heat such compositions only to the range of 265° to 275° C.

In contrast to the partially condensed co-hydrolyzates of the aryl trihalosilane-alkyl trihalosilane type materials under discussion, such as a phenyl and ethyl silicon trihalide co-hydrolyzate condensate, the materials of the present invention which combine a portion of such cohydrolyzates with the modifying material described above, have outstanding increased heat stability, as well as other advantageous properties. In accordance with this finding, moldings and films of the material of the present invention have been prepared and tested for their heat resistance, it being initially noted in connection with the materials that they may be handled at extremely high temperatures much more readily than the prior materials discussed above. Thus, removal of the materials from a molding press without bothering to cool the same over an extended period of time is perfectly possible with these materials, and films prepared from a solution of the material by evaporating off the solvent are found to be tough and clear, completely free of crazing or other indications of strains, whereby the absence of degradation of any sort is clearly indicated.

Films and moldings containing from 9%–35% of the added glycerol reaction product, on testing at various temperatures, are found to be unchanged up to and including 371° C. after 3 hours of heating at this temperature. Moreover, 3 hours of further heating at 454° C. produced only slight darkening of the materials. Another advantage of the present materials is that upon evaporating a solvent from a solution of the resin, in order to prepare a molding powder therefrom, the excessive foaming which heretofore has been experienced in preparing the unmodified phenyl-ethyl resin of the aforesaid Hirsch case, is completely eliminated and the solvent is easily evaporated from the resin by heating the same until it is not tacky at 170° C. The material hardens on cooling and may suitably be ground to a molding powder, which can subsequently be molded at temperatures of the order of 240° C. and at pressures of the order of 5000 p. s. i. Moldings prepared in this manner, whether filled or unfilled, may be removed from the mold without cooling and show no signs of strain or cracking. In addition to these advantages, films prepared of unfilled resin by evaporating the solvent therefrom are found to be completely unaffected by immersion in water for a period of 2 days.

In order that those skilled in the art may more completely understand the character of the invention and its preferred method of practice, the following specific examples are offered.

EXAMPLE I

*Part A.—Preparation of partially condensed co-hydrolyzate of phenyl silicon trichloride and ethyl silicon trichloride*

Phenyl silicon trichloride is prepared by the Grignard route by reacting bromobenzene with magnesium in ether and thereafter reacting the phenyl magnesium bromide thus formed with silicon tetrachloride to form a mixture of phenyl silicon chlorides. The phenyl silicon trichloride is separated from the reaction products by distillation after removal of the ether and silicon tetrachloride. The fraction boiling between 145° and 155° C. at 200 mm. Hg pressure, most of which boils at 147° C., is taken as the phenyl silicon trichloride fraction. Substantially the same procedure is followed to produce ethyl silicon trichloride, i. e., after the mixture of ethyl silicon chlorides has been separated from the ether and silicon tetrachloride, the fraction boiling between 99° and 101° C. at atmospheric pressure is taken as the ethyl silicon trichloride fraction. Eight mols of phenyl silicon trichloride are thoroughly mixed with 2 mols of ethyl silicon trichloride in toluol solution, using about 2 volumes of toluol per volume of the organo-silicon halides. The toluol solution of the mixed organo-silicon halides is then added to a mixture of ice and water, which is kept constantly agitated during the addition. After all of the solution of the organo-silicon chlorides has been added, the hydrolysis mass is agitated vigorously for about 10 minutes, following which a toluol solution of the hydrolyzate of phenyl silicon trichloride and ethyl silicon trichloride mixture is allowed to separate therefrom. The aqueous layer is withdrawn from contact with the toluol solution of the hydrolyzate and discarded. The toluol solution of the hydrolyzate is placed in a suitable container fitted with a vapor take-off leading to a water-cooled condenser, which in turn is attached to a receiver; the containing flask is externally heated with steam until the concentration of the resin solids in the solution is about 60%. This solution is put aside for use in the following part of the example.

*Part B.—Preparation of glycerol reaction product*

A 3-neck flask is fitted with a dropping funnel, mercury-sealed stirrer, and a reflux condenser. A mixture of 167 parts of phenyl silicon trichloride (0.8 mol) and 32 parts of ethyl silicon trichloride (0.2 mol) is placed in the flask. To this mixture there are added with stirring 64 parts of methyl alcohol (2 mols). The mixture is refluxed for about one hour after the addition of the alcohol has been completed. To the mixture of organo-silicon di-methoxy chlorides, there are added 352 parts of benzene. The mixture is stirred until a uniform mass is obtained, and 62 parts of glycerine (0.66 mol) are then added dropwise to the benzene solution of the mixture of organo-silicon di-methoxy chlorides. After the addition of the glycerine is complete, the contents of the reactor are heated and the reaction mass becomes turbid. The heating is continued near the boiling point of the contents of the flask and the turbidity disappears; the solution becomes a clear, colorless mass. A thermometer is placed in the vapor entrance from the reactor to the condenser during the heating period in order to determine the vapor temperature during refluxing and heating. Immediately after the addition of the glycerine to the benzene solution of the organo-silicon dimethoxy chlorides, the reflux temperature is noted to be 45° C. and to rise slowly thereafter to 61° C., indicating that methyl alcohol is evolved from the reaction mass after and during the reaction of the glycerine with the halogen of the mixture of organo-silicon di-methoxy chlorides. The contents of the reaction flask are then subjected to distillation, during which about 19.8 parts of methyl alcohol are recovered; thereafter, the temperature rises to about 80° C., at which temperature the benzene added to the reaction flask distills. After substantially all of the benzene has distilled off, the contents of the flask are subject to vacuum (at 5 mm. Hg pressure) and heated to a temperature of 131° C., during which treatment the reaction mass becomes viscous. This viscous mass is taken up in toluol solution to provide a solution having 60% of resin solids therein.

*Part C.—Preparation of composition of this invention*

80 parts of the solution prepared in accordance with Part A above are blended with 20 parts of solution prepared in accordance with Part B above and after complete physical mixing, the solvent is evaporated off on a steam bath. The material is then heated in an oven at 140° C. for 1 hour, preferably not longer than 1½ hours, after which it is found to be substantially completely cured, no catalyst for the condensation being employed. Some of the material is heated in the oven in shallow pans, whereby a film is provided of approximately 5/100ths of an inch in thickness at the end of the heating period. This film is immersed in water for a period of 2 days and is found to be unaffected. Another portion of the film is heated at 404° C. for 5 hours, after which the film is found to be extremely flexible and unaffected as to color, there being no discernible difference between its flexibility before and after this heat treatment. A portion of the resinous material as freed of its solvent in the oven is ground in a hammer-mill to a fine powder and is molded in a press at 6000 p. s. i. and at a temperature of 240° C. for a period of ½ hour, no added filler being employed. At the end of this time, a hard, tough molding is obtained which is only shatterable by extremely sharp blows of a hammer or like article, and which withstands the effect of being dropped from a height of 8 feet to a concrete floor without visible change.

EXAMPLE II

Combinations are prepared in accordance with the following table from the materials of Parts A and B above:

| Part A | Part B |
|---|---|
| Percent | Percent |
| 90 | 10 |
| 70 | 30 |
| 65 | 35 |
| 75 | 25 |

Castings and films are prepared from these four mixtures in accordance with the same procedure reported with respect to Example I, Part C, and the same tests are applied thereto. No discernible change occurs, after heating at 404° C. for 5 hours, in any of the films and the castings display substantially the same degree of toughness and strength as described in connection with the material of Example I.

The materials of the present invention may be used alone in solid comminuted form or in conjunction with inert filler materials to produce suitable molding compositions. As the fillers are not believed to enter into chemical combination with the siloxane, no limitation other than inertness and heat resistance need be placed thereon. For example, the material of the present invention may be used in conjunction with mineral salts, such as barium sulfate, fibrous minerals, such as serpentine or asbestos, refractory oxides, such as alkaline earth oxides, magnesium oxide, titanium, zirconium, and other similar oxides, carbon black, certain of the mineral sulfides, such as antimony trisulfide, glass wool or powder, artificial minerals, such as rock wool, refractory silicates and mixed silicates, pigments, talc, mica, and the like.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition comprising in solution in an organic solvent between about 65 and about 90 parts of a partially condensed co-hydrolyzate of a mixture of phenyl silicon trihalide with ethyl silicon trihalide, said ethyl silicon trihalide amounting to at least 10 mol per cent and not more than 30 mol per cent of the total of said silicon trihalides, and between about 10 and about 35 parts of an organo-silicon composition comprising a reaction product of a trihydroxy compound comprising glycerol, with a material selected from the group consisting of a compound of the formula R—Si(OR')$_2$X, wherein R is selected from the group consisting of mono-nuclear aryl, alkaryl, and lower aliphatic hydrocarbon radicals, R' is a hydrocarbon radical, and X is a halogen selected from the group consisting of chlorine and bromine, and mixtures of such compounds of said formula, said reaction product being present in said solution in an amount up to 35% of the combined weight of said partially condensed co-hydrolyzate and said reaction product.

2. A composition as claimed in claim 1, freed of its solvent and heated for a period of 1½ hours at at least 140° C.

3. A composition of matter comprising in solution in toluol between about 65 and about 90 parts of a partially condensed co-hydrolyzate of a mixture of phenyl silicon trichloride with ethyl silicon trichloride, said ethyl silicon trichloride amounting to at least 10 mol per cent and not substantially more than 30 mol per cent of the total of said silicon trichlorides, and between about 10 and about 35 parts of an organo-silicon composition comprising a reaction product of a trihydroxy compound comprising glycerol, with a material selected from the group consisting of a compound of the formula R—Si(OR')$_2$X wherein R is selected from the group consisting of mono-nuclear aryl, alkaryl, and lower aliphatic hydrocarbon radicals, R' is a hydrocarbon radical, and X is a halogen selected from the group consisting of chlorine and bromine, and mixtures of such compounds of said formula, said partially condensed co-hydrolyzate amounting to not less than 65% of the total weight of said partially condensed co-hydrolyzate and said reaction product.

4. A composition as claimed in claim 3, freed of its solvent.

5. A composition of matter comprising a solution in toluol of between about 65 and about 90 parts of a partially condensed co-hydrolyzate of a first mixture of about 80 mol per cent of phenyl silicon trichloride and about 20 mol per cent of ethyl silicon trichloride, and an organo-silicon composition comprising between about 10 and about 35 parts of the reaction product of a trihydroxy compound comprising glycerol with a second mixture of compounds selected from the group consisting of compounds of the formula R—Si(OR')$_2$X, wherein R is selected from the group consisting of phenyl, ethyl, and methyl radicals, R' is a hydrocarbon radical, and X is selected from the group consisting of chlorine and bromine, and wherein the phenyl compound of said second mixture is present to the extent of 70–90 mol per cent of said second mixture.

6. A composition as claimed in claim 5, freed of its solvent.

7. The method of making a siloxane composition of matter characterized by its ability in thin films to withstand temperatures of the order of 404° C., which includes the steps of preparing a partially condensed co-hydrolyzate of a mixture of between 79–90 mol per cent of phenyl silicon trichloride and 10–30 mol per cent of ethyl silicon trichloride in a solvent therefor, combining therewith a solution of a reaction product of glycerol with a material selected from the group consisting of a compound of the formula R—Si(OR')$_2$X, wherein R is selected from the group consisting of mono-nuclear aryl, alkaryl, and lower aliphatic hydrocarbon radicals, R' is a hydrocarbon radical, and X is a halogen selected from the group consisting of chlorine and bromine, and mixtures of such compounds of said formula, said reaction product amounting to between about 10% and about 35% of the combined weight of said reaction product and said partially condensed co-hydrolyzate, and heating the mixture of said partially condensed co-hydrolyzate and said reaction product for a period up to 1½ hours at a temperature of the order of 140° C.

References Cited in the file of this patent

UNITED STATES PATENTS

| Number | Name | Date |
|---|---|---|
| 2,486,162 | Hyde | Oct. 25, 1949 |
| 2,584,351 | Hunter et al. | Feb. 5, 1952 |